Sept. 7, 1965 J. A. VOSS ETAL 3,204,635

HYGIENIC DEVICES

Filed March 21, 1963 5 Sheets-Sheet 1

JOSEPH A. VOSS
CARL W. JOHNSON
INVENTORS

BY Fraser and Bogucki
ATTORNEYS

Sept. 7, 1965 J. A. VOSS ETAL 3,204,635

HYGIENIC DEVICES

Filed March 21, 1963 5 Sheets-Sheet 2

JOSEPH A. VOSS
CARL W. JOHNSON
INVENTORS

BY Fraser and Bogucki
ATTORNEYS

Sept. 7, 1965 J. A. VOSS ETAL 3,204,635
HYGIENIC DEVICES
Filed March 21, 1963 5 Sheets-Sheet 3

JOSEPH A. VOSS
CARL W. JOHNSON
INVENTORS
BY [signature]
ATTORNEYS

INVENTORS
JOSEPH A. VOSS
CARL W. JOHNSON
BY [signature]
ATTORNEYS

Sept. 7, 1965

J. A. VOSS ETAL 3,204,635

HYGIENIC DEVICES

Filed March 21, 1963

5 Sheets-Sheet 5

INVENTORS
JOSEPH A. VOSS
CARL W. JOHNSON
BY Fraser and Bogucki
ATTORNEYS

United States Patent Office 3,204,635
Patented Sept. 7, 1965

3,204,635
HYGIENIC DEVICES

Joseph A. Voss, Denver, and Carl W. Johnson, Boulder, Colo.; said Johnson assignor to said Voss
Filed Mar. 21, 1963, Ser. No. 266,914
12 Claims. (Cl. 128—263)

The present invention generally relates to hygienic devices and more particularly relates to improved hygienic devices such as catamenial tampon devices and to improved methods of fabricating the same.

Various absorptive media are conventionally inserted in body cavities in furtherance of hygienic procedures. Rapid, convenient and relatively painless insertion of such media are necessary requirements for devices of this nature. Moreover, the media should be insertable by the application of only a small amount of force. Unqualified user acceptance is achieved only by devices which meet the very highest standards in these respects.

Discomfort may be encountered during insertion of an hygienic device into body cavities where the tissues defining the cavities are relatively sensitive and where such tissues in the relaxed condition narrow substantially the cavity, as is the case with vaginal tissues. For example, conventional catamenial tampon applicators do not provide uniformly for rapid yet smooth and easy insertion of tampons into the vagina with a minimum of effort and with substantial freedom from discomfort under all conditions. One such applicator employs a thin loosely held stick adapted for use in ejecting the tampon. Difficulties are encountered within this device, particularly in properly directing the tampon ejection force since the stick is unstable in position. Moreover, most such applicators have relatively blunt or squared-off entry ends which are of relatively large size. Therefore, considerable frictional resistance, with consequent irritation of the vaginal mucosa, may occur upon insertion of the applicator, as the vaginal cavity is expanded relatively abruptly and forcibly. Moreover, the tampon itself must be moved free of the applicator into the vagina, and may encounter considerable frictional resistance from the engaging vaginal tissue. The most widely used vaginal tampons have a blunt forward end conforming to that of the applicator itself and extend from the forward end of the applicator so that the entry of the tampon into a body cavity often is impeded.

Such applicators have another disadvantage. Because they are bulky in appearance, there is a tendency on the part of the user to employ catamenial applicators with tampons insufficient in volume to absorb and retain the menstrual flow for a substantial period of time. Accordingly, frequent use is made of undersized tampons, thus depreciating their inherent utility.

Where previously known vaginal tampon applicators included tapered and narrowed entry or forward ends to facilitate insertion into the vagina, considerable force was required to press the tampon through the forward end and out of the applicator. The tampon may also be compressed to a considerable extent under such circumstances, and thus may have lowered absorptive properties. Moreover, the walls of the forward end of the tampon applicator may fray the tampon material, thereby increasing the difficulty of inserting the tampon and also increasing the difficulty of removing all of the tampon from the vagina after use.

Tampon applicators may include an outer tube which initially contains the tampon and an inner tube by means of which the tampon may be ejected. The greater the force which is needed for tampon ejection, the more likely that fibers of the tampon may be caught between the inner and outer tubes during ejection. When this happens, the tampon may be ejected in a damaged condition or may fail to release from the applicator. It will be appreciated that a catamenial applicator which meets with full consumer approval must be exceptionally simple and easy to use, requiring little pressure to release the tampon from the applicator and also must be capable of being made uniformly so that defective applicators can be kept to an absolute minimum.

Ideally, a catamenial tampon device should have a finished and uniform appearance, and maintain its appearance and ease of operation despite long periods of storage prior to use. It should operate smoothly and require the application of only a small force to eject the tampon without fraying the tampon and without damage to the applicator. Any changes made to increase the efficiency of operation of the applicator should not materially increase its cost nor require the user to modify the normal manner of use of the applicator. Preferably, the applicator should be fabricated of readily disposable material.

Accordingly, a principal object of the present invention is to provide improvements in hygienic devices adapted for insertion of media into body cavities.

It is also an object of the present invention to provide improved catamenial devices for the insertion of tampons and improved methods of fabricating the same.

A further object of the present invention is to provide an improved catamenial applicator and an improved tampon therefor.

It is a further object of the present invention to provide hygienic devices which allow the rapid and easy insertion of hygienic media in body cavities without discomfort and with a minimum of physical effort or force.

It is also an object of the present invention to provide a tampon applicator which can be inserted into the vagina with particular ease and comfort and from which a tampon can be ejected readily without applying substantial force and without substantial distortion, compression or other damage of the tampon.

It is a still further object of the present invention to provide an improved tampon for use with such applicators, the tampon being constructed so that it can be ejected readily from the applicator by the use of minimal force and can pass into body cavities with a minimum of tissue resistance.

These and other objects of the invention are accomplished in accordance with the invention by providing an improved catamential tampon device which incorporates an outer generally cylindrical tube having a smooth, substantially frictionless generally conically shaped forward end which is insertable into the vagina without discomfort. A tampon is disposed in the outer tube ahead of a tampon-ejecting means. Although the diameter of the outer tube may be relatively large so as to accommodate a tampon having a large menstrual flow-absorbing capacity, the outer tube is relatively slim and trim in appearance and can pass easily into the vagina due to its conically shaped forward end. Thus, the device meets with customer acceptance while providing for the use of optimally sized tampons. The forward end of the outer tube incorporates improved opening means which may comprise a plurality of tightly abutting dovetailed folds which provide an essentially unidirectionally openable construction. The fold lines are partially weakened but of sufficient structural integrity so that the forward end of the outer tube can be inserted into the vaginal cavity without danger of collapse. Subsequently, however, the forward end of the outer tube opens readily as a tampon is passed into the vaginal cavity, without requiring any undue pressure or force by the user on the tampon-ejecting means, and without binding of the outer tube or tampon-ejecting means against the tampon. In one aspect of the invention, means are provided to maximize ease of insertion of the outer tube in the vagina and ease of expulsion of the tampon from the outer tube. Such means include extremely smooth inner and outer walls of the outer tube, preferably with a similarly smooth outer wall for the tampon-ejecting means disposed in the outer tube. The force required to expel the tampon from the outer tube can be reduced to an essentially minimal level of less than one pound force.

Maximum ease of expulsion of the tampon from the outer tube is also afforded in another aspect of the invention through the use of a slit or slot (hereinafter referred to as slit) in the conically shaped forward end of the outer tube and which may also extend along a portion of the body of the outer tube rearward of the forward end. A plurality of such slits may be present, preferably symmetrically disposed in the forward end of the outer tube. Thus, the conical end of the outer tube can be fanned out readily, due to the presence of such slit or slits, during expulsion of the tampon. However, such forward end of the outer tube can be readily maintained in a tightly closed position, preferably through the use of closure means which may comprise an encircling ring, band or strip releasably secured in tightly enclosing relation to the forward end. If desired, the closure means can be provided with a pull tab. Also, if desired, the closure means can be incorporated in an outer envelope or packaging, such as cellophane, which can be disposed around the forward portion or all of the device. In such instance, removal of the closure means would simultaneously open the packaging for access to the device.

The device is usable for other purposes such as medicated tampons, but is particularly suitable for use as a catamenial tampon dispenser. As a further feature of the invention, the device may include improved means for ejecting the tampon without substantial binding of the rear end of the tampon between adjacent portions of the ejecting means and the outer tube of the device. The improved means may include a relieved forward portion on the ejecting means. Such forward portion engages the rear of the tampon and is in spaced apart relation to the outer tube. Further in accordance with the invention, binding of the main body of the ejecting means with the outer tube is prevented. Thus, in one aspect of the invention, the tampon-ejecting means may be provided with a longitudinally extending slot through the wall thereof so that the diameter of the tampon-ejecting means will decrease readily upon application of pressure thereto, as by gripping the outer tube during use of the applicator. A plurality of such slots can be used, if desired. Thus, the tampon-ejecting means flexes sufficiently so that it will not bind against the outer tube or cylinder under normal conditions of use.

Further in accordance with the present invention, the device may be provided with specially shaped detent means which not only releasably hold the outer tube and tampon-ejecting means in suitable juxtaposition but preferably also inhibit lateral movement or twisting of the tampon-ejecting means in the outer tube before and during ejection of the tampon.

Also in accordance with the present invention, a catamenial tampon is provided which has a tapered forward end conforming to the shape of the forward end of the outer tube. Accordingly, passage of the tampon through the outer tube and along the vaginal cavity is facilitated. The sealed forward end of the applicator provides an attractive appearance and prevents soiling of the tampon disposed within the applicator before its use. The device is simple, inexpensive and highly effective for its intended purposes.

Further advantages of the present invention will be apparent from the following detailed description and the accompanying drawings, of which:

FIG. 1*a* is a perspective view of one embodiment of a catamenial tampon device in accordance with the present invention incorporating one form of closure means;

FIG. 1*b* is a fragmentary perspective view of the embodiment of FIG. 1*a* with, however, a modified form of closure means;

Figures 1A, 1B:
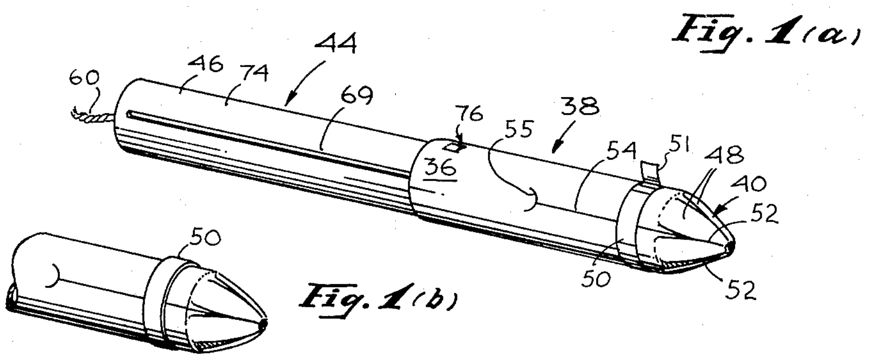

Referring more particularly to the accompanying drawings, a preferred embodiment of a catamenial tampon device 36 in accordance with the present invention is illustrated in various views in FIGS. 1*a*, 1*b*, 2, 3 and 4. The device 36 comprises a hollow outer tube 38 which is preferably generally cylindrical and which includes a generally conical or steeple-shaped forward end 40 which can be inserted easily and rapidly into a body cavity, such as the vagina, without discomfort. The device 36 also includes a tampon 42 shown in FIGS. 2, 3 and 4, normally disposed within the forward end 40 of the outer tube 38, and a tampon-ejecting means 44 disposed within the outer tube 38 rearward of the tampon 42 and preferably comprising a hollow inner tube 46 of generally cylindrical configuration. The outer surface of the inner tube 46 is in sliding engagement with the inner surface of the outer tube 38 so as easily to telescope therein to eject the tampon 42 out the forward end 40 of the outer tube 38 with a minimum amount of force, i.e., less than one pound force. The outer and inner tubes 38 and 46, respectively, comprise an applicator adapted to facilitate insertion of the tampon 42 into a vagina.

Figure 10:
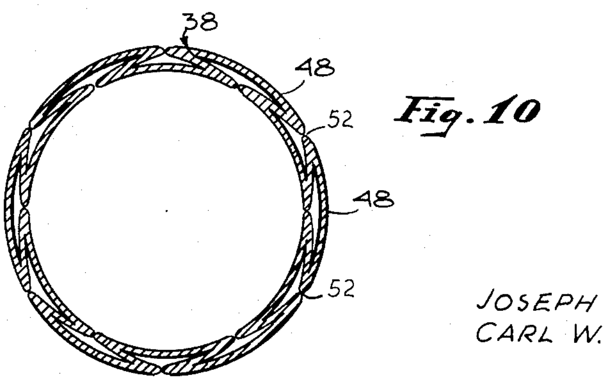
FIG. 10 is a section taken along the line 10—10 of FIG. 8.

The tapered generically conical forward end 40 of the outer tube 38 may be partially frusto-conical, as illustrated. In accordance with the present invention, the forward end 40 of the outer tube 38 is formed preferably from a generally uniform cylinder which is worked so as to have a plurality of tightly abutting symmetrically disposed folds 48 arranged in a dovetailed configuration, as more clearly illustrated in FIG. 10 of the accompanying drawings. The folds can also be properly described as box pleats or box plaits, as clearly shown in the drawings. It is an important part of this invention that the dovetailed configuration provides the forward end 40 of the outer tube 38 with a smooth and substantially continuous outer surface, as shown particularly in FIG. 1*a*, thus minimizing frictional resistance of the forward end 40 with tissues lining body cavities during insertion of the outer tube 38 thereinto. Moreover, the smooth, generally conical forward end 40 of tube 38 is attractive and slim in appearance. This gives the entire device 36 a relatively slim look, although the diameter of tube 38 rearward of forward end 40 is such as to accommodate a tampon 42 of sufficiently large diameter and volume to absorb adequately menstrual flow over a substantial period of time. The slim trim appearance of device 36 is attractive to prospective users and encourages their selection of forms of the device 36 containing tampons which are of adequate diameter and volume to provide long-continued menstrual flow-absorbing action, in contrast to conventional catamenial devices.

During forming of the forward end 40 of the outer tube 38, the tube material lying on the fold lines 52 between adjacent folds 48 can be sufficiently weakened by repeated folding and unfolding thereof so that in the finished product the tampon 42 can be easily passed through end 40 with little forward thrust or force applied to the inner tube 46. However, to assure maximum ease of opening of the forward dovetailed folded end 40 of the outer tube 38 during passage of the tampon 42 forwardly therethrough, it is preferred to provide a slit 54 (which may instead be a slot, if desired) which runs longitudinally along the outer tube 38 and which extends through the wall thereof, as shown in FIG. 1*a*. Of considerable importance, slit 54 extends partially or all the way through the wall of outer tube 38 in forward end 40, preferably along or adjacent to a fold line 52, as shown in FIG. 1*a*. Slit 54 preferably also extends rearward of forward end 40 for at least a short distance, again as shown in FIG. 1*a*. It will be understood that a plurality of slits 54 can be provided. For example, slits 54 can be disposed in a plane intersecting forward end 40 so that two slits 54 are provided. Additional slits 54 also can be provided, preferably in a symmetrical arrangement. A generally transversely extending, preferably crecent-shaped, slit 55 may be provided at the rear end of each slit 54 in the wall of the outer tube 38 so as to prevent inadvertent rearward extension of slit 54. Moreover, although slit 54 is usually of uniform diameter throughout its length, if desired it can be made to widen slightly or flare out at its forward extremity.

Figure 3:
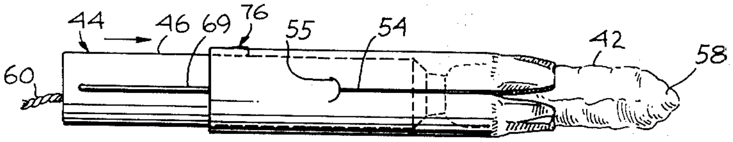
FIG. 3 is a side elevation of the catamenial device of FIG. 1*a*, illustrating the opening of the forward conical end of the outer tube during passage of a tampon therethrough.
Figure 4:
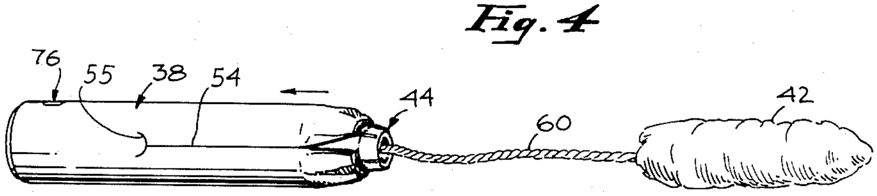
FIG. 4 is a perspective view illustrating the catamenial device of FIG. 1*a* with a tampon fully ejected therefrom.

As can be seen from FIGS. 3 and 4, as the tampon 42 is ejected from the outer tube 38, slit 54 readily opens up adjacent the forward end thereof, allowing the forward end 40 of outer tube 38 to expand readily in diameter, so that a forward thrust or force by the user on the inner tube 46 of usually less than about one pound is all that is needed to eject the tampon. This is in contrast to previous catamenial devices having tapered ends which require the application by the user of considerably higher tampon-ejecting force, with attendant inconvenience and, in some cases, distortion and fraying of the tampon and/or applicator. It will be understood that an arrangement which provides a minimal tampon-ejecting force is much preferred, particularly because the vagina is located in a position which obscures direct observation of the tampon-ejecting procedure.

Figure 2:
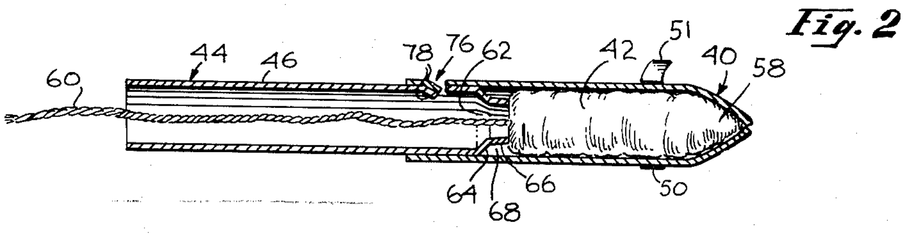
FIG. 2 is a sectional view of the device of FIG. 1*a*.

The forward end 40 of the outer tube 38 can be said to be unilaterally or unidirectionally openable, in that it will not deform inwardly from its closed position before use, particularly because of the position of the shaped tampon 42 therein, as shown in FIG. 2, but opens outwardly very readily under the urging of the tampon 42. When the outer tube 38 is provided with one or more slits 54, it is preferred, although not absolutely essential, to provide the outer tube 38 in the area in which slits 54 are located with closure means which may comprise an encircling ring or strip of material, such as adhesive tape, cellophane, etc., as shown in FIGS. 1*a*, 1*b* and 2, which ring or strip aids in maintaining the forward end of tube 38 in a closed position around tampon 42. Ring or strip 50 should be fabricated of material which can be released readily from around the outer tube 38 so as to free the outer tube 38 for use as shown in FIGS. 3 and 4. Thus, for example, it can be a narrow ring of cloth or paper closely disposed around tube 38, and which can be slipped on and off of the outer tube 38. The ring is shown in FIG. 1*b*. Alternatively, it can be an adhesive strip applied directly to the surface of the outer tube 38 as shown in FIG. 1*a* and easily removable therefrom. As another example, closure means 50 can be a strip of cellophane or the like which may be incorporated into a light weight packaging (not shown) closely disposed around the device 36. In such instance, means 50 can be arranged to open the packaging so as to facilitate removal of the device 36 therefrom. In the latter two instances, means 50 may be provided with a pull tab 51 to facilitate its rapid removal from around the outer tube 38 prior to use of device 36 in the deposition of a tampon or other hygienic medium in a body cavity, that is, prior to use of device 36 as shown in FIGS. 3 and 4.

As shown in FIGS. 3 and 4, after the removal of the closure means 50 from around outer tube 38, the forward end 40 of the outer tube is unfolded to the initial prefolded form without substantial distortion, compression or other damage to the tampon during such ejection, and without fraying of the outer tube 38 itself. Moreover, the slit 54 further protects the tampon 42 during such ejection against pressure exerted by the forward end 40 of the outer tube 38. The slit 54 not only allows easy expansion of end 40 of outer tube 38 during ejection of the tampon therefrom but also allows end 40 to return readily to its original diameter after ejection of the tampon. Moreover, end 40 does not deform inwardly before ejection of the tampon 42 therefrom, so that outer tube 38 retains its shape before use. The configuration of end 40 of outer tube 38 is such that practical tampon applicator devices in accordance with the invention can be operated with less than one pound total force. The tightly abutting folds of the forward end 40 of outer tube 38 present a desirable finished appearance, and a uniformly smooth surface to the touch. Accordingly, the device 36 is compact, highly functional and attractive.

As shown in FIG. 2, the tampon 42 preferably has a tapered, generally conical forward end 58 substantially conforming to the shape of the forward end 40 of outer tube 38. Thus, resistance between the forward end 40 of outer tube 38 and tampon 42 during ejection of the tampon from outer tube 38 is minimized and smooth, easy passage of the tampon into the vagina is facilitated. A draw-string 60 fabricated of conventional cellulosic material or the like is connected to the rear end of the tampon 42 and passes rearwardly through the tampon-ejecting inner tube 46 and out of the device 36.

The inner tube 46 is sufficiently long with respect to the outer tube 38 to be used as the plunger or tampon-ejecting means 44, and can be telescoped forwardly through the outer tube 38 to extend from the forward conical end 40 thereof, as shown in FIG. 4. Tube 46 is preferably provided with a specially shaped forward end 62 which minimizes binding of fibers of the tampon 42 between the adjoining walls of inner tube 46 and outer tube 38 during such telescoping.

As shown in FIG. 2, the forward end 62 of tube 46, which is adjacent tampon 42, is relieved so that for a selected length it has a smaller diameter than the remainder of the inner tube 46. It is preferred to provide the forward end 62 with a tapered shoulder 64 and an open-ended small diameter terminal portion 66. The shoulder 64 and terminus 66 may be formed of a plurality of tightly abutting dovetailed folds that is, box pleats or box plaits, as described more particularly hereafter. With such an arrangement, annular space 68 is thus provided between end 62 and the adjacent portion of outer tube 38. Accordingly, the material of the rear end of tampon 42 does not catch, bind and fray between adjoining surfaces of the inner tube 46 and outer tube 38, and passage of the tampon through the outer tube 38 is facilitated thereby.

Moreover, the main body of inner tube 46 is preferably provided with a longitudinal slot 69 in the wall thereof, as shown, for example, in FIGS. 1*a* and 3, which slot, for example, may extend from the shoulder 64 rearwardly to just short of the rear end of inner tube 46. Slot 69 allows inner tube 46 to be deformed inwardly so as to eliminate any tendency of inner tube 46 to bind against outer tube 38 when outer tube 38 is gripped and slightly deformed inwardly during telescoping of inner tube 46 therein and ejection of tampon 42 from outer tube 38. Accordingly, minimal frictional resistance of tubes 38 and 46 is assured during tampon ejection so that the amount of force required to eject the tampon is kept very low.

The inner and outer tubes 46 and 38, respectively, can be fabricated of any suitable foldable material, for example, a cellulosic fibrous material, such as paper, paperboard, cardboard, plastic, resilient rubber or the like, or a combination of such materials, such as plastic-coated paper. The inner and outer tubes also can be fabricated of the same or different types of material. The material utilized for both the inner tube 46 and the outer tube 38 must be capable of being readily folded, in accordance with the method of the present invention, and the material of outer tube 38 must also be capable of being sufficiently weakened, as by repeated folding and unfolding along fold lines thereof, and/or cutting slit 54 therein, so as to cause forward end 40 thereof to unfold readily during passage of the tampon 42 or other hygienic medium therethrough.

In one embodiment of the invention, a two-ply construction is employed for the outer tube 38, comprising an inner layer of kraft paper and a thinner outer layer or coating of smooth plastic. This permits working and weakening of the fibers of the inner layer without disturbing the smooth attractive appearance of the outer layer. Alternatively, as shown in FIG. 35, outer tube 38 can be constructed of laminated material comprising an intermediate layer 70 of cellulosic fibrous material, such as kraft paper or the like, to both sides of which are bonded thin layers 72 of covering, such as sheet, film or coating of smooth synthetic plastic material, such as polyethylene film. Preferably, in such instance the outer surface 74 of inner tube 46 carries a similar covering of film, sheet or coating of smooth plastic so that inner tube 46 can slide within outer tube 38 with a minimum of frictional resistance, thereby aiding in minimizing the total force necessary to expel tampon 42 from outer tube 38, and also further contributing to the attractive appearance of the device 36. It will be understood that laminates such as those described have the further advantage of being light weight and readily disposable. The components of the laminates have a tendency to be easily strippable from one another after the used device is discarded and exposed to water immersion, i.e., passed into a drainage or sewage system, thus avoiding clogging of the same.

The tampon 42 in the catamenial device 36 illustrated in FIG. 1 can be fabricated of a suitable conventional material, such as quilted or laminated absorbent cotton, fibrous cellulosic tissue, or the like. It will be obvious that device 36 can include, in place of tampon 42, another suitable hygienic medium, if desired.

Again referring particularly to FIGS. 1*a*, 2 and 3, the device 36 is preferably provided with means 76 which stabilize the position of the inner tube 46 within the outer tube 38. As more particularly illustrated in FIG. 2, the stabilizing means 76 preferably include matched detents or flaps 78 in both the inner tube 46 and the outer tube 38. Detents 78 are forwardly and downwardly inclined and preferably are generally channel shaped. Detents 78 of the shape described not only inhibit withdrawal of inner tube 46 rearwardly from outer tube 38, but also inhibit rotary movement, i.e., slipping or twisting of inner tube 46 within outer tube 38. In this regard, at least the forward portions of detents 78 are of substantial width so that tubes 46 and 38 are, in effect, locked together against lateral movement of one of tubes 46 and 38 against the other while not interfering with forward telescoping of inner tube 46 within outer tube 38 during ejection of tampon 42 therefrom. Accordingly, correct passage of inner tube 46 within outer tube 38 is facilitated.

The tapered, essentially closed-end, unilaterally openable catamenial tampon device 36 operates in the same general manner as prior art open-end catamenial devices. Thus, the advantages of a closed-end device over an open-end device, including maintaining the tampon 42 sealed within the tube 38 before use, the improved appearance of the device 36, and the ease of insertion of tube 38 in the vagina are obtained without any of the several disadvantages of the usual closed-end devices, including difficulty of ejecting the tampon. Instead, the ease with which the tampon can be ejected from the outer tube 38 compares favorably with that of open-end catamenial devices. Also, there is no need for special instructions in the handling or manipulation and use of the improved device 36.

Figure 5:
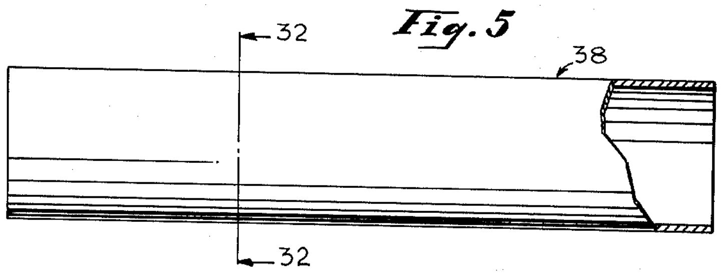
FIG. 5 is a side elevation, partially broken away, of the outer tube of the device of FIG. 1*a* prior to the forming operations thereon.
Figure 6:
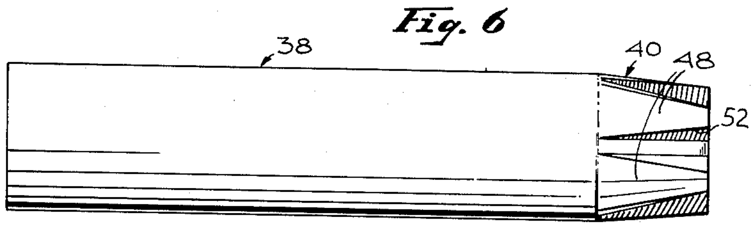
FIG. 6 is a side elevation of the outer tube of FIG. 5 after crimping or partial folding thereof.
Figure 7:
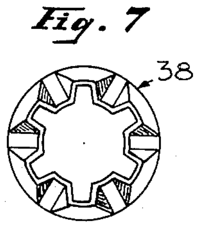
FIG. 7 is a front view of the outer tube of FIG. 6.
Figure 8:
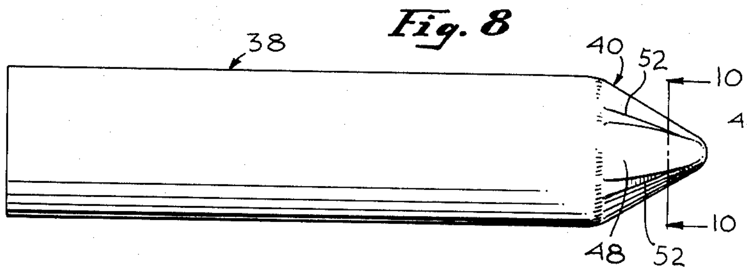
FIG. 8 is a side elevation of the outer tube of FIG. 5 after fully folding the front end thereof.
Figure 9:
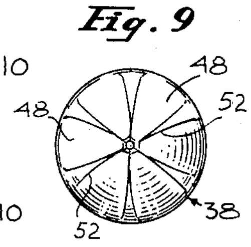
FIG. 9 is a front view of the outer tube of FIG. 8.
Figures 11, 12, 13, 14, 17:
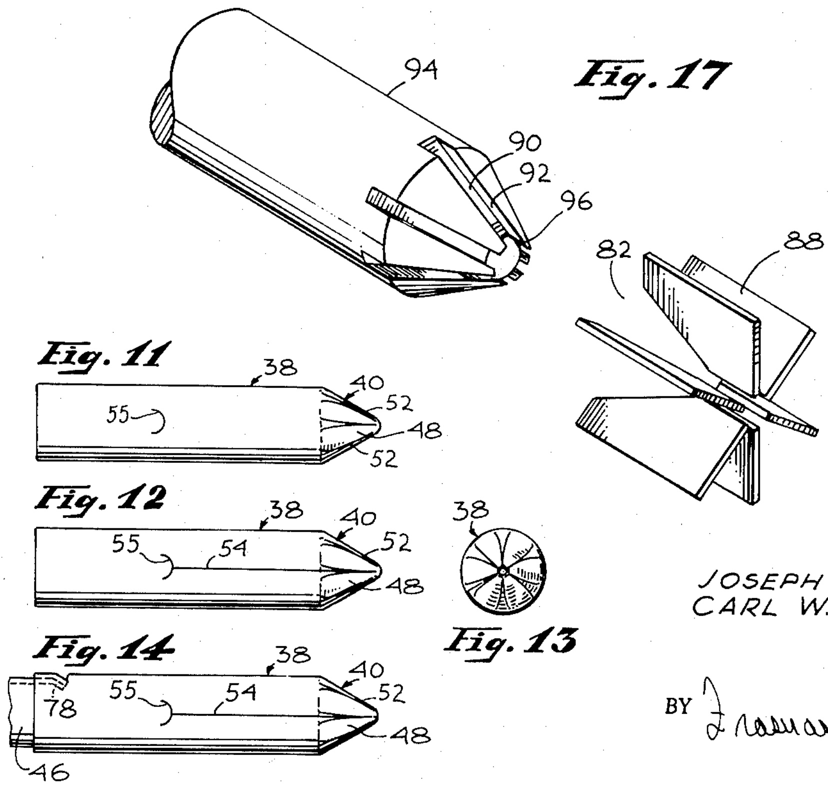
FIG. 11 is a side elevation of the outer tube of FIG. 8 after a crescent shaped slit is cut therein to restrict extension of a subsequently applied longitudinal slit.
FIG. 12 is a side elevation of the outer tube of FIG. 11 after a longitudinal slit is cut therein.
FIG. 13 is a front view of the outer tube of FIG. 12.
FIG. 14 is a side elevation of a fully assembled applicator, including the outer tube of FIG. 12, after a channel shaped detent, illustrated in dotted outline, is formed therein.
FIG. 17 is a perspective view of the crimping means of FIG. 15.

In forming the catamenial device 36 of FIGS. 1*a*, 1*b*, 2, 3 and 4, in accordance with the method of the present invention, the outer tube 38, as shown in FIG. 5, is first crimped or partially folded adjacent one end thereof (end 40) to a generally conical or steeple shape, as shown in FIGS. 6 and 7. In this regard, a plurality of folds are symmetrically disposed around one end (end 40) thereof. End 40 is then fully folded to the form shown in FIGS. 8 and 9 so as to have a substantially smooth, essentially continuous, generally conically shaped surface comprising a plurality of dovetailed folds 48, as particularly shown in FIG. 10. As shown in FIG. 11, the crescent shaped slit 55 can then be cut into outer tube 38, as by a needle or cutting blade, and the longitudinal slit or slits 54 can be cut into outer tube 38, as by a cutting blade, wheel or the like as shown in FIGS. 12 and 13. The forward end 40 of outer tube 38 can then be reworked, i.e., refolded so that it is tightly folded together. If more than one slit 54 is used, the plurality of slits 54 are preferably symmetrically disposed in end 40 of outer tube 38.

During the processing, the fully folded forward end 40 of the outer tube 38 can, if desired, be fully unfolded and fully refolded one or more times to weaken further the material from which outer tube 38 is fabricated along the fold lines 52 thereof between adjacent folds 48 to reduce further the total force required to open forward end 40 thereof during tampon ejection. However, in most instances, the additional unfolding and full refolding steps will not be requireed to provide the forward end 40 with maximum ease of unfolding. Outer tube 38 is now ready for assembly into the catamenial device 36.

Figure 15:
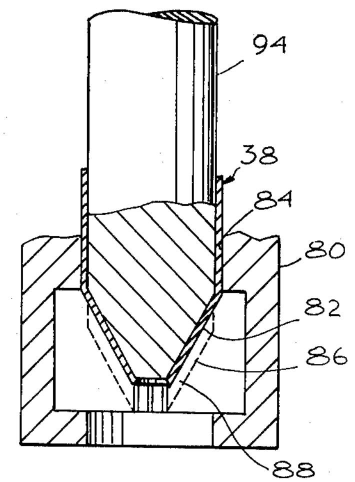
FIG. 15 is an enlarged partial section of crimping means for partially folding or crimping the outer tube of FIG. 5, a portion of said outer tube being illustrated during said crimping.
Figure 16:
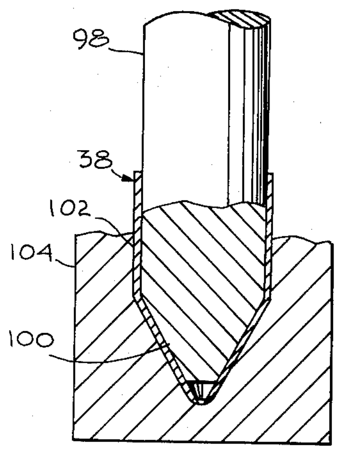
FIG. 16 is an enlarged partial section of means for fully folding the tube of FIG. 5, a portion of said tube being illustrated during said folding.

Any suitable means can be employed for forming the finished outer tube 38, in accordance with the present method. Such means can be manually or automatically mechanically operated. In this regard, means for manually forming the finished outer tube 38 are schematically illustrated in FIG. 15 to FIG. 17 of the accompanying drawings. In FIG. 15, a female die 80 is illustrated in section. Die 80 has a central cavity 82, the upper portion 84 of which has a diameter just large enough to accept outer tube 38 and the lower portion 86 of which is generally frusto-conical and is defined in large part by a plurality (for example, six) of downwardly and inwardly inclined spaced wedges 88 (see in phantom section) corresponding in position to grooves 90 in the frusto-conical lower end 92 of mating male die 94. The general shape of wedges 88 is more particularly indicated in perspective view in FIG. 17. Male die 94 is generally cylindrical and has a diameter so that it closely fits within the cavity in outer tube 38. The grooves 90 radiate from the top 96 of the end 92 thereof.

The described crimping or partial folding operation on outer tube 38 is carried out by disposing male die 94 in outer tube 38 and pushing end 40 of outer tube 38 in the cavity 82 in female die 80 until outer tube 38 and male and female dies 94 and 80, respectively, are in the positions indicated in FIG. 15. The result is that wedges 88 force end 40 of outer tube 38 inwardly along what become fold lines 52, wedges 88 being aligned with grooves 90, to fold end 40 to the configuration illustrated in FIG. 6. Outer tube 38 is then separated from dies 80 and 94 and is ready for the full folding step.

Full folding of the crimped end 40 of outer tube 38 can be carried out manually by inserting male die 98 in outer tube 38, the lower end 100 of die 98 being generally smooth and conical or steeple-shaped, as shown in FIG. 16. Die 98 is dimensioned to abut closely the inner surface of outer tube 38. The end 100 of die 98 is disposed within the crimped end 40 of outer tube 38. The end 100 of die 98 has a more conical configuration with a smaller tip or point and a groove-free surface, in contrast to end 92 of die 94, so that the crimped or partially folded end 40 of outer tube 38 can be fully folded to a tightly abutting dovetailed folded configuration.

The die 98—outer tube 38 combination is then pressed into a central cavity 102 in mating female die 104. Cavity 102 is shaped as illustrated in FIG. 16, being defined by a smooth wedge-free continuous surface, and is dimensioned so that end 40 of outer tube 38 is pressed between the female die 104 and male die 98 into the desired tightly dovetailed folded configuration.

The outer tube 38 can then be removed from contact with die 104 and male die 98 and the generally crescent shaped slit 55 can be cut therein, as shown in FIG. 11, whereupon the longitudinal slit 54 can be cut therein, as shown in FIGS. 12 and 13. Slits 55 and 54 can be cut by any suitable means. Slit 54 extends between slit 55 and the tip of end 40, preferably along or near a fold line 52, as previously described.

Outer tube 38 can then be reshaped, since the folds usually become somewhat loosened during the cutting operations, by fully refolding, utilizing means such as male die 98 and female die 104 in the manner previously described for the initial full folding step. Outer tube 38 is now ready for assembling with inner tube 46 and tampon 42 into the finished catamenial device 36. However, if it is desired to unfold fully and refold the forward end 40 thus formed, suitable unfolding means, such as a pointed steeple-shaped opener (not shown) can be used to open fully the end 40 and the dies 98 and 104 can be reused in the previously described manner to repeat the full refolding step one or more times.

If desired, the indicated forming of outer tube 38 can be carried out to a finished condition by automatic means. For example, a drum (not shown) can be used, in which a plurality of outer tubes 38 are disposed in indexing positions and are simultaneously acted upon by mating male and female dies. The outer tubes 38 in such an arrangement can be advanced in timed sequence through the various forming steps with the male and female dies reciprocating into and out of contact therewith to effect the various forming operations thereon. The male and female dies can be constructed substantially as previously described for the manually operated dies. The various cutting operations on outer tube 38 can also be carried out, as well as the final full folding operation. It will be understood that other arrangements of forming equipment can be used to accomplish the same purposes.

Figure 18:
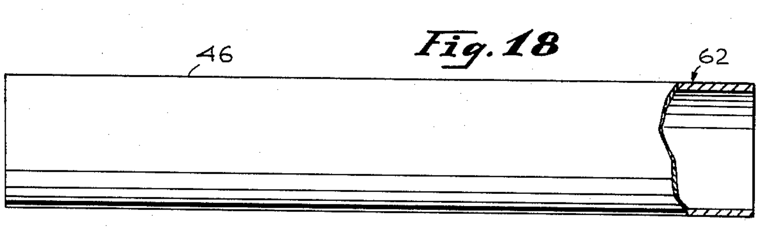
FIG. 18 is a side elevation, partially broken away, of the tampon-ejecting inner tube utilized in the catamenial device of FIG. 1*a*.
Figure 19:
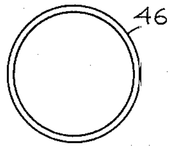
FIG. 19 is a front view of the inner tube of FIG. 18.
Figure 20:
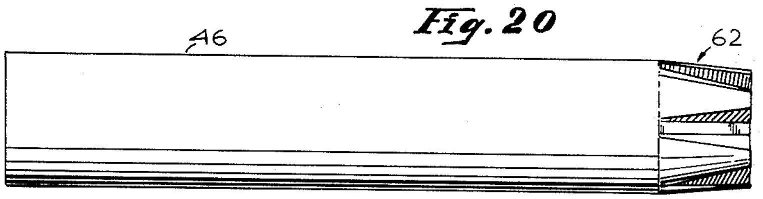
FIG. 20 is a side elevation of the inner tube of FIG. 18 after partial folding or crimping operations thereon.
Figure 21:
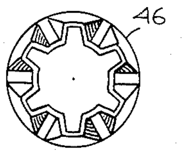
FIG. 21 is a front view of the inner tube of FIG. 20.
Figure 22:
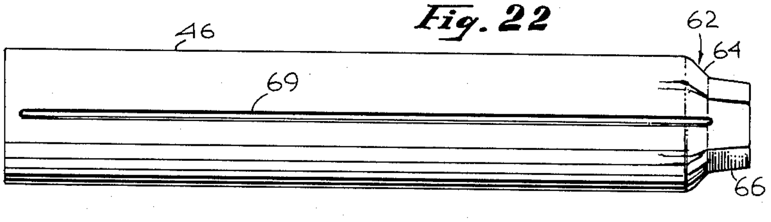
FIG. 22 is a side elevation of the inner tube of FIG. 20 after final folding and shaping operations thereon.
Figure 23:
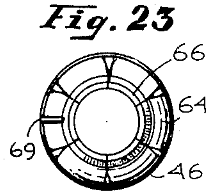
FIG. 23 is a front view of the inner tube of FIG. 22.

The inner tube 46 is also subjected to suitable folding operations as shown in FIGS. 18 to 25, inclusive. In this regard, inner tube 46, shown in FIGS. 18 and 19, is initially partially folded or crimped, as shown in FIGS. 20 and 21, to provide one end thereof, i.e., end 62, with a reduced diameter and then is fully folded and reshaped, as shown in FIGS. 22 and 23, to provide end 62 with the described closely abutting plurality of dovetailed folds shaped to form the tapered shoulder 64 and the terminal portion 66 of reduced diameter.

Figure 24:
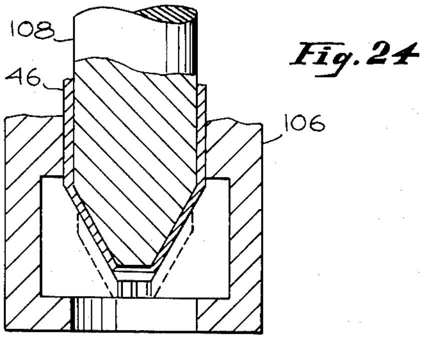
FIG. 24 is an enlarged partial section of apparatus utilized in the crimping of the front portion of the inner tube illustrated in FIG. 18.

The forming operations can be carried out on inner tube 46 either manually or automatically, as with outer tube 38, and utilizing equipment generally similar to that employed for the outer tube 38 forming operations. For example, in manually forming inner tube 46 to a finished configuration, the equipment illustrated in FIGS. 24 and 25 can be employed. A female die 106 generally similar in design to but of slightly smaller size (conforming to that of inner tube 46) than female die 80 is illustrated in FIG. 24. Die 106 is utilized with a mating male die 108 generally similar in design to, but of slightly smaller size than, male die 94. Partial folding or crimping of end 62 of inner tube 46 to the configuration illustrated in FIGS. 20 and 21 is accomplished by inserting male die 108 in inner tube 46 and pressing the die-tube combination into female die 106 to the position shown in FIG. 24.

Figure 25:
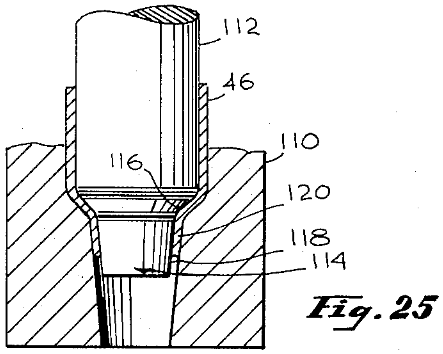
FIG. 25 is an enlarged partial section of means for final folding and shaping of the inner tube of FIG. 18.
Figure 32:
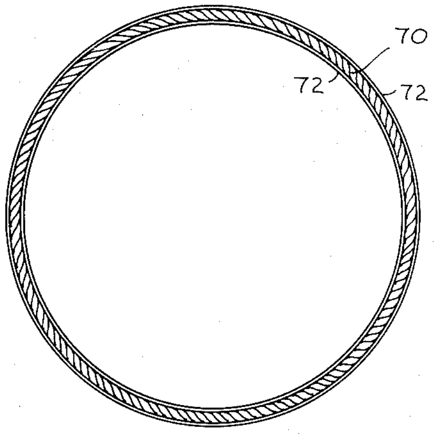

After separation of inner tube 46 from dies 106 and 108, inner tube 46 can be manually fully folded and shaped to the configuration illustrated in FIGS. 22 and 23, as by use of the female die 110 and male die 112 illustrated in FIG. 25. Male die 112 is generally cylindrical with a diameter conforming to the inner diameter of inner tube 46 and has one end 114 thereof provided with a tapered shoulder 116 and a tapered terminal portion 118 of smaller diameter than the remainder of die 112. Female die 110 is of such configuration as substantially to mate with male die 112 but provide a small clearance therebetween equal to the thickness of the wall of inner tube 46. Upon insertion of die 112 in inner tube 46 with end 114 in end 62, as shown in FIG. 25, the die-tube combination is pressed into cavity 120 of female die 110 to fold fully and shape end 62 of inner tube 46 to provide the desired shoulder 64 and terminal portion 66. The shoulder 64 and terminal portion 66 are made up of symmetrically arranged dovetailed folds which are tightly abutting so that unfolding thereof will not occur during normal usage of inner tube 46. Slot 69 can be cut through the wall of inner tube 46, as by a wheel cutter blade (not shown), before or after any of the described forming steps. The finished inner tube 46 is then ready for assembly into the device 36 of FIGS. 1*a*, 1*b*, 2, 3 and 4.

Tampon 42 of suitable size and shape can be formed by any suitable conventional fabricating means, such that its forward end is generally conically shaped to conform to the end 40 of outer tube 38. Closure means 50 may then be applied around outer tube 38 in the area containing slit or slits 54, preferably around the main body of outer tube 38 in that area. However, it will be understood that if closure means 50 is to be incorporated into an outer packaging around device 36, it can, if desired, be placed around outer tube 38 after final assembly of device 36.

Tampon 42 is then disposed within the forward portion of the outer tube 38, whereupon inner tube 46 is inserted in outer tube 38 with end 62 thereof adjacent the rear end of tampon 42. Drawstring 60 is passed rearwardly through the cavity in inner tube 46, as by suction or the like, so as to extend rearwardly therefrom. The detents 78 may then be formed in the outer tube 38 and inner tube 46 at one or more locations, by suitable cutters, punches or the like so that they are forwardly and inwardly directed, as shown in FIG. 2. The device 36 is thus fully assembled and ready for use as a catamenial device. Of course, outer packaging may be applied around device 36, if desired, whether or not such packaging incorporates closure means 50.

The described forming operations carried out on outer tube 38 and inner tube 46 are relatively simple and inexpensive, and are equally well adapted for high speed automatic procedures and for manual procedures. High quality catamenial and other hygienic devices in accordance with the present invention can be fabricated thereby in quantity and at relatively low cost.

Figures 26, 27:
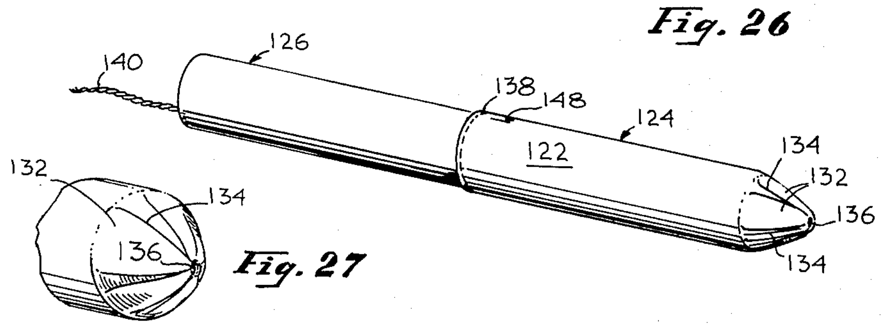
FIG. 26 is a perspective view of a second embodiment of the catamenial device of the present invention.
FIG. 27 is an enlarged fragmentary perspective view of the front end of the outer tube illustrated in FIG. 26.
Figure 28:
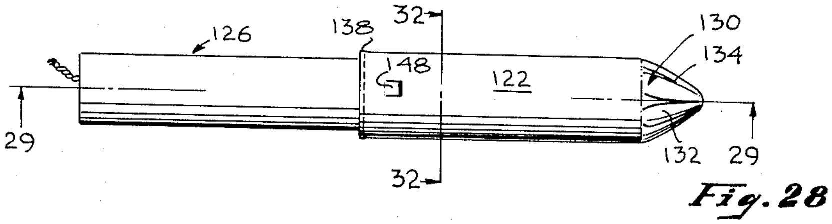
FIG. 28 is a top plan view of the catamenial device of FIG. 26 before ejection of a tampon therefrom.
Figure 29:
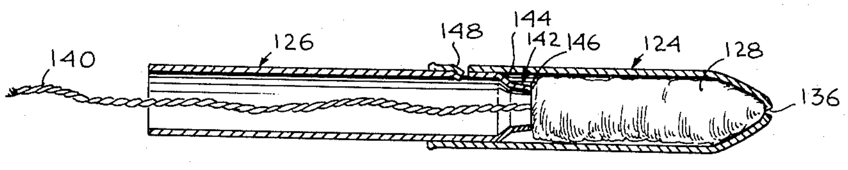
FIG. 29 is a section along the section line 29—29 of FIG. 28.
Figure 30:
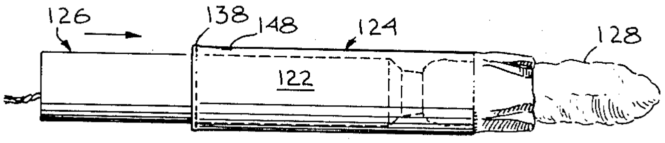
FIG. 30 is a side elevation of the catamenial device of FIG. 26, illustrating a tampon partially ejected therefrom.
Figure 31:
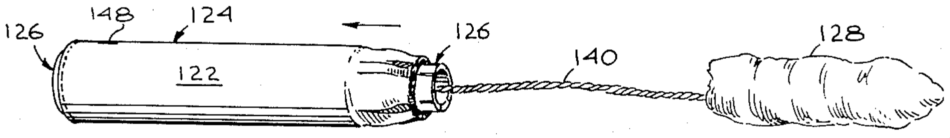
FIG. 31 is a perspective view of the catamenial device of FIG. 26, illustrating a tampon fully ejected therefrom; and, FIG. 32 is a section taken along the section line 32—32 of FIG. 5 illustrating one embodiment of the construction of the outer tube of FIG. 5.

A second embodiment of the improved device of the present invention is illustrated in FIGS. 26 to 34 of the drawings. In FIG. 26, a catamenial device 122 is shown in perspective view. Device 122 is generally similar to device 36 in that it comprises an outer tube 124, an inner tampon-ejecting tube 126 and a tampon 128. Outer tube 124 is substantially similar to outer tube 38. Thus, it has a conically-shaped or steeple-shaped forward end 130 formed of a plurality of preferably symmetrically disposed tightly abutting dovetailed folds 132 separated by fold lines 134. Folds 132 provide forward end 130 with a substantially smooth, continuous surface with a small central opening 136. As with forward end 40 of outer tube 38, forward end 130 allows outer tube 124 to be easily and smoothly inserted into the vagina with a minimum of effort and without discomfort. As shown in FIGS. 26 to 31, forward end 130 does not have a slit therein corresponding to slit 54 of tube 38. Instead, during its formation, end 130 is first partially folded or crimped, then fully folded, and finally unfolded and refolded a sufficient number of times to weaken the material thereof at fold lines 134 sufficiently so that forward end 130 can be fully unfolded from the fully folded position with a minimum of force, that is, less than about one pound of force. The optional closure means 50 which are preferably utilized with the device 36 are unnecessary with the device 122.

Outer tube 124 may also be provided with a small ridged deformation or thickened grip 138 adjacent the rear end thereof. Grip 138 can be provided, as by upsetting the rear end of outer tube 124, so as to facilitate positive positioning of device 122 during use. As in device 36, the tampon 128 of device 122 has a generally conically-shaped forward end and is provided with a drawstring which is connected to the rear end thereof and extends rearwardly through inner tube 124. Drawstring 140 is sufficiently long so it extends beyond the rear extremity of outer tube 126, as shown in FIG. 26.

Inner tube 126 has a shape generally similar to that of inner tube 46, particularly the smaller diameter forward end 142 thereof, which includes the tapered shoulder 144 and small diameter terminal portion 146. One or more longitudinal slots comparable to slot 69 of device 36 can also be provided, if desired.

After tampon 128 is disposed in the end 130 of outer tube 124, inner tube 126 is positioned at the rear end of tampon 128 and drawstring 140 is passed back therethrough, as by suction. Forwardly and downwardly directed detents 148 similar to detents 78 can then be provided in outer tube 124 and inner tube 126 to inhibit inadvertent withdrawal of inner tube 126 rearwardly from outer tube 124, while not significantly affecting the smoothness and ease with which inner tube 126 can be telescoped forward in outer tube 124 for ejection of tampon 128.

Tubes 124 and 126 can be formed to finished condition manually or automatically utilizing generally the same equipment as previously described for the forming of tubes 38 and 46. The grip 138 may be formed adjacent the rear end of outer tube 124 through the use of any suitable forming equipment applied at any stage of processing, preferably in the final forming step.

The improved hygienic devices, such as catamenial devices, provided by the present invention allow the smooth simple insertion of suitable media, such as tampons, suppositories and the like into body cavities, using a minimum of force, for example, less than about one pound total pressure applied to the medium-ejecting means. The smooth, essentially continuous, generally conical or steeple shaped front end of the outer tube not only is of attractive appearance and lends a trim slim appearance to the remainder of the device, but also permits easy insertion of the outer tube of the device into a body cavity without discomfort. Moveover, during passage of the medium from the forward end of the outer tube, the forward end of the outer tube readily unfolds to at least a prefolded condition, and may even expand beyond that size, due to the presence of slit or slits 54 therein, so as not to resist to any substantial extent such passage and so as not to compress or distort the medium passing therethrough into the body cavity. When slits 54 are present, closure means 50 is preferably used and is closely disposed around the outer tube to releasably hold the forward part of the outer tube in a closed position around the tampon before use of the device. The tampon or other medium is preferably shaped to conform to the forward part of the outer tube and to facilitate passage in a body cavity.

The narrowed or necked-down forward end of the inner tube of the device is effective in preventing binding of the rear end of the hygienic medium between the forward end of the inner tube and the adjoining surface of the outer tube. Accordingly, fraying, tearing and distortion of the medium during ejection thereof from the hygienic device is prevented. Moreover, the longitudinal slot in the inner tube facilitates telescoping of the inner tube in the outer tube during ejection of the medium from the device. The inner and outer tubes can also have very smooth surfaces which further decrease drag or frictional resistance during tampon ejection and with further enhance the appearance and disposability of the device. The specially shaped matched detents in the walls of the inner and outer tubes prevent rotation of the inner tube in the outer tube and inhibit rearward withdrawal of the inner tube from the outer tube while not interfering with forward movement of the inner tube in the outer tube.

The closed forward end of the device prevents soiling of the medium within the device prior to use. Various other advantages of the present invention are as set forth in the foregoing.

Although particular catamenial devices and particular methods have been described to illustrate various manners in which such devices can be fabricated and utilized in accordance with the present invention, it will be appreciated that the present invention is not limited to such particular illustrations and descriptions. Accordingly, any and all modifications, alterations and equivalent arrangements for such devices and the methods of fabricating the same falling within the scope of the following claims should be considered to be part of the present invention.

What is claimed is:

1. An hygienic applicator comprising, in combination, a tubular member within which an hygienic medium is adapted to be disposed, and means disposed within said tubular member and adapted to eject said hygienic medium from said tubular member, said tubular member including a forward end, the exterior surface of which is substantially smooth and generally conically shaped, a plurality of discrete, independent folds in said forward end, said folds being regularly disposed along substantially straight longitudinal fold lines about said forward end, adjacent ones of said folds being in abutting relation at said forward end, the material between the folds being internally disposed of said substantially smooth and generally conically shaped exterior surface, said folds forming and maintaining the generally conical shape of said forward end, said folds being adapted to unfold readily to a substantially tubular configuration during ejection of an hygienic medium from the forward end thereof by said ejection means.

2. An hygienic applicator comprising, in combination, a tubular member within which an hygienic medium is adapted to be disposed, and means releasably positioned within said tubular member adjacent the rear end thereof and adapted to eject an hygienic medium from said tubular member, said tubular member including a forward end, the exterior surface of which is substantially smooth and generally conically shaped, a plurality of discrete independent dovetailed folds in said forward end, said folds being regularly disposed along substantially straight longitudinal fold lines about said forward end, adjacent ones of said folds being in abutting relation at said forward end, said folds forming and maintaining the generally conical shape of said forward end, and said folds being adapted to unfold readily to a substantially tubular configuration during ejection of an hygienic medium from said forward end by said ejection means.

3. A tampon applicator comprising, in combination, a tubular member adapted to contain a tampon, and means adjacent the rear end of said tubular member adapted for ejecting a tampon from said tubular member, said tubular member including a forward end, the exterior surface which is substantially smooth and generally conically shaped, a plurality of discrete independent dovetailed folds in said forward end, said folds being regularly disposed along substantially straight longitudinal fold lines about said forward end, adjacent ones of said folds being in abutting relation at said forward end, said folds forming and maintaining the generally conical shape of said forward, end and said folds being adapted to unfold readily on flexible fold lines therebetween to expand to a substantially tubular configuration of at least about the same diameter as the remainder of said tubular member during ejection of a tampon from said forward end by said ejection means, said tubular member having at least one longitudinal slit in said forward end, said slits facilitating said expansion of said forward end.

4. A catamenial device which includes a tampon applicator comprising a substantially cylindrical tampon container having a forward end, the exterior surface of which is smooth and generally conical shaped, a plurality of symmetrically disposed discrete independent dovetailed folds with flexible fold lines therebetween in said forward end, said folds being regularly disposed along substantially straight longitudinal fold lines about said forward end, adjacent ones of said folds being in abutting relation at said forward end, said folds forming and maintaining the generally conical shape of said forward end, a tampon, and ejection means positioned within said container for telescoping therewith, and said ejection means being adapted to eject the tampon from said container through said front end portion.

5. A tampon applicator comprising, in combination, a first generally cylindrical tubular member adapted to contain a tampon, and a second tubular member coaxially and releasably disposed within said first tubular member ajacent the rear end thereof and adapted to telescope therein to eject a tampon from the forward end the exterior surface of which forward end is generally conical and smooth, a plurality of discrete independent dovetailed folds in said forward end, said folds being regularly disposed along substantially straight longitudinal fold lines about said forward end, adjacent ones of said folds being in an abutting relation at said forward end, said folds forming and maintaining the generally conical shape of said forward end, said folds being adapted to unfold readily into a substantially tubular configuration as said tampon is ejected, while maintaining said tampon in substantially unaltered form, and said forward end also having at least one longitudinal slit extending the length of and disposed at about a fold line separating two adjacent folds, for facilitating expansion of said forward end.

6. The tampon applicator of claim 5 wherein said first and second tubular members have matched inwardly and forwardly directed crescent-shaped detents adapted to hold releasably said tubular members together while permitting forward telescoping and restricting rearward and rotary movement of said second tubular member within said first tubular member, and wherein said second tubular member has a forward end portion of reduced size and comprising a tapered shoulder and small diameter terminal portion adapted to engage said tampon for ejection thereof from said first tubular member without binding of said tampon between said first and second tubular members.

7. A tampon applicator comprising, in combination, a first generally cylindrical tubular member within which a tampon is adapted to be disposed and a second tubular member coaxially and releasably disposed within said first tubular member adjacent the rear end thereof and adapted to telescope therein to eject a tampon from the forward end of said first tubular member, said first tubular member, the exterior surface of which forward end is closed, generally conical and smooth, a plurality of discrete, independent folds formed by box pleats in said forward end, said folds being regularly disposed along substantially straight longitudinal fold lines about said forward end, adjacent ones of said folds being in abutting relation at said forward end, said folds forming and maintaining the generally conical shape of said forward end, and adapted to unfold readily into a substantially tubular configuration as a tampon is ejected therethrough, while maintaining said tampon in substantially unaltered form, at least the outer surface of said second tubular member and at least the inner surface of said first tubular member having a covering of a readily slideable substance adapted to reduce frictional resistance between said first tubular member and said second tubular member when said members are telescoped together.

8. The tampon applicator of claim 7 wherein said first and second tubular members have matched inwardly and forwardly directed generally channel shaped detents adapted to hold releasably said tubular members together while permitting forward telescoping and restricting rearward and rotary movement of said second tubular member within said first tubular member, wherein said first tubular member has a positive positioning grip adjacent the rear end thereof, and wherein the forward end of said second tubular member comprises a tapered shoulder and a small diameter terminal portion adapted to engage said tampon for ejection thereof from said first tubular member without binding of said tampon between said first and second tubular members.

9. A hygienic device comprising a first tubular member within which an hygienic medium is disposed and a second tubular member positioned within and adjacent the rear end of said first tubular member for ejecting said hygienic medium from said first tubular member, said first tubular member having a forward end, the exterior surface of which is substantially smooth and generally conical shaped, a plurality of discrete, independent folds in said forward end, said folds being regularly disposed along substantially straight longitudinal fold lines about said forward end, adjacent ones of said folds being in abutting relation at said forward end, said folds comprising box pleats which form and maintain the generally conical shape of said forward end, said folds being adapted to unfold readily to a substantially tubular configuration during ejection of said medium from said forward end, said second tubular member having a forward end, comprising a tapered shoulder and reduced diameter terminal portion, whereby an annular space is provided between said forward end and the adjoining wall of said first tubular member, so that binding of said hygienic medium between said first and second tubular members during said ejection is avoided.

10. The hygienic device of claim 4, wherein the forward end of said tampon is generally conically shaped.

11. The hygienic device of claim 9 wherein at least the inner surface of said first tubular member and at least the outer surface of said second tubular member each have a covering of a readily slidable substance adapted to reduce frictional resistance between said first tubular member and said second tubular member when said members are telescoped together.

12. The hygienic device of claim 9 wherein said hygienic medium is a tampon the forward end of which is generally conically shaped.

References Cited by the Examiner

UNITED STATES PATENTS

| | | | |
|---|---|---|---|
| 2,092,427 | 9/37 | Ross | 128—263 |
| 2,351,836 | 6/44 | Popper | 128—263 |
| 2,413,480 | 12/46 | Winter | 128—263 |
| 2,587,717 | 3/52 | Fourness | 128—263 |
| 2,754,822 | 7/56 | Emelock | 128—264 |
| 2,829,646 | 4/58 | Kurkjian | 128—263 |
| 2,884,925 | 5/59 | Meynier | 128—285 |

FOREIGN PATENTS

| | | |
|---|---|---|
| 1,023,187 | 3/53 | France. |

RICHARD A. GAUDET, *Primary Examiner.*

UNITED STATES PATENT OFFICE
CERTIFICATE OF CORRECTION

Patent No. 3,204,635 September 7, 1965

Joseph A. Voss et al.

It is hereby certified that error appears in the above numbered patent requiring correction and that the said Letters Patent should read as corrected below.

Column 5, line 74, for "crecent-shaped" read -- crescent-shaped --; column 7, line 73, for "35" read -- 32 --; column 9, line 12, for "requireed" read -- required --; column 11, line 37, for "34" read -- 31 --; column 13, line 56, after "forward" strike out the comma; column 14, line 43, strike out "said first tubular member,".

Signed and sealed this 31st day of May 1966.

(SEAL)
Attest:

ERNEST W. SWIDER
Attesting Officer

EDWARD J. BRENNER
Commissioner of Patents